United States Patent [19]

Bosomworth et al.

[11] Patent Number: 5,045,511

[45] Date of Patent: Sep. 3, 1991

[54] CERAMIC BODIES FORMED FROM YTTRIA STABILIZED ZIRCONIA-ALUMINA

[75] Inventors: Paul A. Bosomworth; Cinta M. Kelzenberg; Kenneth R. Butcher, all of Hendersonville, N.C.

[73] Assignee: Alusuisse-Lonza Services, Ltd., Zurich, Switzerland

[21] Appl. No.: 484,848

[22] Filed: Feb. 26, 1990

[51] Int. Cl.⁵ .................. C04B 38/00; C04B 35/48; C04B 35/80

[52] U.S. Cl. .................... 501/85; 501/95; 501/105; 264/44; 210/510.1; 75/411; 75/412

[58] Field of Search .............. 75/411, 412; 210/510.1; 501/85, 95, 105; 264/44

[56] References Cited

U.S. PATENT DOCUMENTS

| | | | |
|---|---|---|---|
| 3,893,917 | 7/1975 | Pryor et al. | 75/411 |
| 4,024,212 | 5/1977 | Dole et al. | 264/44 |
| 4,035,191 | 7/1977 | Johns | 501/103 |
| 4,265,659 | 5/1981 | Blome | 210/773 |
| 4,789,651 | 12/1988 | Sugie et al. | 501/103 |
| 4,839,049 | 6/1989 | Kinney, Jr. et al. | 210/510.1 |

FOREIGN PATENT DOCUMENTS

| | | | |
|---|---|---|---|
| 5614473 | 7/1979 | Japan . | |
| 2168336 | 6/1986 | United Kingdom | 210/510.1 |

*Primary Examiner*—William R. Dixon, Jr.
*Assistant Examiner*—Anthony J. Green
*Attorney, Agent, or Firm*—Bachman & LaPointe

[57] ABSTRACT

Ceramic bodies suitable for use in the filtration of molten metal are formed by immersing a porous organic substrate material in an aqueous thixotropic slurry containing yttria, zirconia and alumina; expelling excess slurry; drying the impregnated material; and heating to an elevated temperature to burn off the organic material and sinter the ceramic materials. The resulting zirconia-alumina ceramic bodies have from about 5-80% of the zirconia in a monoclinic phase and the remainder of the zirconia essentially in a stabilized cubic phase due to the yttria. The ceramic bodies thus produced have excellent strength, density, and thermal shock resistance properties.

14 Claims, No Drawings

CERAMIC BODIES FORMED FROM YTTRIA STABILIZED ZIRCONIA-ALUMINA

BACKGROUND OF THE INVENTION

The present invention relates to ceramic bodies formed from yttria stabilized zirconia-alumina having particular utility as molten metal filters.

Molten metals in practice generally contain entrained solids which are deleterious to the final cast metal product. These entrained solids usually derive from three sources. Some are oxide particles which are drawn into the liquid stream from an oxide layer floating on its surface. Others are fragments of furnace lining, transfer trough and other portions of the molten metal handling equipment which are eroded and entrained in the flowing molten metal stream. Still other particles are precipitates of insoluble impurities such as intermetallics, borides, carbides, or precipitates of other metal compounds such as chlorides. When these inclusions appear in the final cast product after solidification, they often cause a decrease in ductility or poor finishing characteristics. Accordingly, it is desirable to remove entrained solids from the molten metal stream before it is cast into a solid body which may be used as such or subjected to forming operations such as rolling, forging, extrusion, etc.

Filtering processes to remove entrained solids from liquids are accompanied by passing the solid-laden liquid through a porous filter medium that will not pass the solids. Filtering molten metal creates special problems because the liquid is so aggressive that it is difficult to find filter mediums capable of withstanding it.

Ceramic foam filter bodies having an open cell structure characterized by a plurality of interconnected voids surrounded by a web of ceramic are employed to remove entrained solids from molten metal. These bodies have been formed from a variety of ceramic materials including alumina-chromia and zirconia-alumina compositions. U.S. Pat. Nos. 3,893,917 to Pryor et al., 3,947,363 to Pryor et al., 4,024,212 to Dore et al., 4,265,659 to Blome, 4,343,704 to Brockmeyer and 4,839,049 to Kinney, Jr. et al. illustrate some of the ceramic materials used to form molten metal filtration bodies and the processes for forming them.

Filters made from zirconia-alumina compositions have been found to have particular utility in filtering molten steel. This is because the filter bodies exhibit excellent physical properties such as high strength, high thermal shock resistance, and high resistance to corrosion at elevated temperatures. One limitation on the use of zirconia-alumina compositions however has been the problem of how to form large filter parts. This problem stems from the fact that during the cool-down portion of a firing cycle zirconia transforms from a tetragonal phase to a monoclinic phase. During this transformation, there is an associated volume expansion on the order of 3–5%. This volume change creates small cracks (microcracks) around the transformed particles, and large cracks (macrocracks) when the zirconia is not transformed uniformly throughout the filter body. While a certain amount of microcracking is beneficial in creating resistance to thermal shock, macrocracking causes failure. Large filters, those greater than eight inches, are particularly prone to macrocracking because of the large temperature gradients induced in them during the firing cycle.

To prevent macrocracking, zirconia has been stabilized with calcia or magnesia. These compounds go into solid solution in the zirconia grains and prevent or reduce the transformation from tetragonal to monoclinic by forming a stable cubic zirconia phase. Unfortunately, these stabilizers do not work well in the presence of alumina. This is because both calcia and magnesia come out of solid solution and react with the alumina rather than the zirconia.

Accordingly, it is an object of the present invention to provide a zirconia-alumina composition which is less prone to the formation of macrocracks.

It is a further object of the present invention to provide a zirconia-alumina composition which may be used to form relatively large parts.

It is yet a further object of the present invention to provide a ceramic body suitable for use as a molten metal filter which is formed from the above zirconia-alumina composition.

Further objects and advantages of the present invention will become more apparent from the following description.

SUMMARY OF THE INVENTION

It has been found that the foregoing objects and advantages may be readily achieved in accordance with the present invention.

The present invention provides a highly efficient, ceramic foam material suitable for use in filtering molten metal. The ceramic foam material is characterized by a relatively low density and excellent room temperature and high temperature strength properties. Still further, the ceramic foam material is less susceptible to the formation of macrocracks and thus readily suitable for fabrication into large parts.

The ceramic material of the present invention comprises a zirconia-alumina composition in which the zirconia is at least partially stabilized with yttria. At room temperature, from about 5% to about 80% of the zirconia in the ceramic material, preferably from about 40% to about 60%, is in a monoclinic phase, while the remainder is essentially in a cubic phase. As a result of this, the ceramic material is substantially less susceptible to the formation of macrocracks. The amount of yttria in the composition is in the range of from about 1.1% to about 3.4%, preferably from about 1.7% to about 2.2%. As used herein, the percentages are weight percentages unless otherwise noted.

A filter body in accordance with the present invention is prepared by impregnating an organic foam material with an aqueous thixotropic slurry containing zirconia, yttria and alumina; expelling excess slurry material; drying the impregnated foam material; and heating the impregnated foam material to a temperature in the range of from about 1570° C. to about 1620° C. for a time period in the range of from about 15 minutes to about 3 hours. During the heating step, the organic foam material is volatilized. As the body cools down after heating, the zirconia becomes at least partially stabilized in a cubic phase.

It has been found that the process of the present invention provides a low cost, porous ceramic filtration medium having the aforementioned physical properties and improved reliability.

DETAILED DESCRIPTION

In accordance with the present invention, a ceramic foam body suitable for use in filtering molten metal such as molten steel is prepared from an open cell, hydrophilic flexible foam material having a plurality of interconnected voids surrounded by a web of the flexible foam material. Typical foam materials which may be used include a polymeric foam such as polyurethane foam and a cellulosic foam. Generally, any combustible organic plastic foam may be used which has resilience and ability to recover its original shape.

The foam material which is utilized must burn out or volatilize at or below the firing temperature of the ceramic material which is employed. Also, it should have a porosity in the range of from 5 to 100 pores per inch in order to provide the necessary filtration surface. The dimensions of the foam material may, of course, be varied depending upon the desired dimension of the end filter material. While one generally utilizes a foam material having a thickness of from about ¼ to about 4 inches, with from about 1 to 3 inches being preferred, larger pieces may be used to form larger parts.

Aqueous ceramic slurries containing zirconia and alumina have been employed to form ceramic bodies for use as molten metal filters. In some of these slurries, the zirconia is stabilized with calcia or magnesia to prevent macrocracking. As previously discussed, it has been found however that these stabilizers do not work well in the presence of alumina. This is because the calcia or magnesia comes out of solid solution and reacts with the alumina. Often, the zirconia in these compositions remain entirely in a monoclinic phase at room temperature.

In accordance with the present invention, an aqueous slurry is formed containing from about 32% to about 64% zirconia, from about 1.0% to about 3.4% yttria to at least partially stabilize the zirconia in the cubic form and to substantially prevent the formation of macrocracks, from about 13.6% to about 47.2% alumina, and the balance essentially water. This slurry composition takes advantage of the discovery that yttria, unlike calcia and magnesia, shows a preference for zirconia even in the presence of alumina.

It has been found that the level of yttria used in the slurry is critical. If too much yttria is used, the ceramic body which is formed will have a low thermal shock resistance. If too little yttria is present, large parts will crack during the firing cycle.

In addition to the foregoing constituents, the slurry may contain from about 0.8% to about 3% of a ceramic fiber such as an alumina fiber for the prevention of drying cracks and strength increases, from about 0.2% to 0.3% of a binder such as Xanthum gum for green strength and slurry stability, and/or from about 0.2% to 2.0% of a dispersant such as a salt of a polymeric carboxyl acid in an aqueous solution for maximum solids content and pH control.

In a preferred embodiment, the aqueous slurry has a composition consisting essentially of from about 56.0% to about 56.5% zirconia, from about 1.5% to about 2.0% yttria, from about 28.1% to about 28.4% alumina, from about 0.86% to about 0.87% ceramic fiber, from about 0.22% to about 0.23% binder, from about 1.90% to about 1.92% dispersant, and the balance essentially water. The water may be added at room temperature, may be hot water, or both.

The aqueous slurry is prepared in the following manner:

1. The binder is fully dissolved in hot water by mixing in a low shear mixer (e.g. model HDM 75, supplied by Charles Ross & Son Company of Hauppage, New York).
2. The yttria is added to the dispersant, and mixed for approximately 15 minutes to a smooth paste using any form of impeller blade or "lightening" mixer.
3. The yttria/dispersant paste is then added to the binder solution in the low shear mixer and blended for 10 minutes.
4. The zirconia and alumina are carefully dry blended in a high shear mixer (e.g. model RL09, supplied by Eirich of Maple, Ontario, Canada) for 1 minute. Ceramic fiber is then added and mixed more vigorously for 3 minutes.
5. The binder from the low shear mixer is added to the dry solids in the high shear mixer and carefully pre-mixed for 3 minutes. The batch is blended more vigorously for a further 4 minutes and then fully mixed at the highest mixer speed for another 2 minutes.

Additional water is added to achieve a desired viscosity. Typically, slurries in accordance with the present invention will have a viscosity in the range of from about 20,000 cP to about 40,000 cP as measured at 20 rpm using a Haake viscometer, model RV3, 30 mm. diameter cup size.

One of the primary advantages of the slurry forming technique of the present invention is that the yttria is added in situ to form the partially stabilized zirconia. By doing this, the amount of yttria can be controlled to produce a desired monoclinic phase content in the final ceramic body. Additionally, a desired balance between size and thermal shock resistance can be obtained. Still further, the yttria addition helps improve the binding ability of the binder(s) used in the system as well as reduce the overall cost of filter production. While pre-mixed yttria stabilized zirconia is commercially available, it is quite expensive. It also has the deficiency that the amount of yttria is not within the prescribed ranges and therefore the material is not suitable for use.

The ceramic bodies of the present invention may be prepared in accordance with the general procedure outlined in U.S. Pat. No. 3,893,917 which is incorporated by reference herein. The foam material is impregnated by immersing it in the aqueous slurry of the present invention so that the web is coated therewith and the voids are substantially filled therewith. The impregnated material is then compressed by squeezing through preset rollers so that preferably about 80% of the slurry is expelled and the balance is uniformly distributed throughout the foam material, preferably so that some pores are blocked in a uniformly distributed manner to increase the tortuosity.

The coated foam material is then dried by any suitable means known in the art. For example, the material may be air dried for about 8 to 24 hours. Alternatively, the material may be dried at a temperature of from 100° C. to about 700° C. for a time of from about 15 minutes to 6 hours. Further, the material may be microwave-dried.

After drying, the material is heated to an elevated temperature in the range of from about 1570° C. to about 1620° C. and maintained at that temperature for a time in the range of from about 15 minutes to about 3 hours. During this heating step, the foam material is burned out or volatilized and the ceramic coating is sintered. This provides a fused ceramic foam body having a plurality of interconnected voids surrounded by a web of bonded or fused ceramic in the configuration of the flexible foam. As the ceramic material is heated and cooled, the zirconia therein becomes at least partially stabilized in the cubic phase.

Ceramic bodies formed in accordance with the present invention have a composition consisting essentially of from about 40% to about 80% zirconia, from about 17% to about 59% alumina, from about 1.1% to about 3.4% yttria and from about 1.1% to about 3.4% ceramic fiber. Preferred bodies have a composition consisting essentially of from about 60% to about 65% zirconia, from about 30% to about 35% alumina, from about 1.7% to about 2.2% yttria and about 1.0% ceramic fiber. Additionally, from about 5% to about 80% of the zirconia therein is typically in a monoclinic phase and the remainder is essentially in a cubic phase. In a preferred embodiment, from about 40% to about 60% of the zirconia in the ceramic body is in a monoclinic phase while the remainder is essentially in a cubic phase.

It has been found that a ceramic body in accordance with the present invention possesses many desirable properties. The most significant of these properties is the fact that at room temperature from about 5-80% of the zirconia in the body is in a monoclinic phase while the remainder is essentially in a stable cubic phase. As a result, the formation of macrocracks is substantially prevented and large parts, those greater than eight inches, may be formed. In a preferred embodiment, sufficient yttria is added so that only from about 40% to about 60% of the zirconia is in a monoclinic phase at room temperature.

It has further been found that the ceramic bodies of the present invention have a much higher strength, both at room temperature and at elevated temperatures, than corresponding zirconia-alumina compositions without yttria. The ceramic bodies of the present invention have a modulus of rupture at room temperature in the range of from about 160 psi to about 410 psi over a relative density range of 10-18.5%, and a high temperature strength in the range of from about 178 psi to about 166 psi at a temperature in the range of from about 1000° C. to about 1550° C.

It has also been found that the ceramic bodies of the present invention have for a given strength a lower bulk density than equivalent zirconia-alumina bodies formed without yttria. For example, the ceramic bodies of the present invention at a relative density of 12-13% are about as strong as standard zirconia-alumina bodies at 18.5% relative density (relative density=bulk density/theoretical density). This is of major importance for the steel industry because low density filters prime easily and offer low resistance to steel flow. The ceramic bodies of the present invention which are suitable for use as molten metal filters may have a bulk density in the range of from about 10% to about 18.5%, preferably from about 12% to about 15%, of the theoretical density for ceramic material of the same size. The theoretical density of yttria stabilized zirconia-alumina is about 4.96 g/cc.

Yet another advantage of the present invention is that larger filter pieces can be manufactured without macrocracks because of the reduced monoclinic content. To date, filters up to about 20 inches in length have been made.

The specific features of the present invention will be more readily understandable from a consideration of the following examples.

EXAMPLE I

A thixotropic slurry in accordance with the present invention was formed. The slurry had a composition as follows:

| Material | % by weight | Typical Batch (lbs) |
| --- | --- | --- |
| Zirconia | 56.2 | 259.0 |
| Alumina | 28.2 | 130.0 |
| Alumina Fiber | 0.9 | 4.0 |
| Yttria | 2.0 | 9.36 |
| Hot Water (40-50° C.) | 9.3 | 44.62 |
| Xanthum gum | 0.2 | 1.04 |
| Dispersant | 1.9 | 8.8 |
| Water | 0.9 | 4.0 |
| Additional Water+ | 0-0.4 | 0-2 |

The slurry was prepared as follows:
1. The Xanthum gum binder was fully dissolved in hot water by mixing in a low shear mixer (e.g. model HDM 75, supplied by Charles Ross & Son Company of Hauppage, New York).
2. The yttria was added to the dispersant, and mixed for approximately 15 minutes to a smooth paste using an impeller blade or "lightening" mixer.
3. The yttria/dispersant paste was then added to the binder solution in the low shear mixer and blended for 10 minutes.
4. The zirconia and alumina were dry blended in a high shear mixer (e.g. model RL09, supplied by Eirich of Maple, Ontario, Canada) for 1 minute. Ceramic fiber was then added and mixed more vigorously for 3 minutes.
5. The binder from the low shear mixer was added to the dry solids in the high shear mixer and carefully pre-mixed for 3 minutes. The batch was blended more vigorously for a further 4 minutes and then fully mixed at the highest mixer speed for another 2 minutes.

4"×4"×1" and 4"×2"×1" ceramic filter bodies were prepared by cutting polyurethane foam pieces to the above dimensions and immersing them in the slurry. Each piece was passed through a pair of preset rollers to expel excess slurry. The pieces were then air dried for 1 hour and passed through a 60 kw microwave drier at a rate of one foot per minute with an air temperature of 95°-105° F. The dried filters were then fired at 1600° C. for about three hours. The strength at room temperature and elevated temperatures including the Young's modulus and the modulus of rupture were measured. Strength was measured using a 3-point or 4-point bend test. Young's Modulus was determined from ultrasonic sound velocity measurements using a "V Meter" supplied by NDT James Instruments. Additionally, the bulk density was measured. The volume was measured by using a digital micrometer to obtain the length, width and height to 0.01 mm accuracy, and the weights were measured to 0.01 g using an electronic balance. The density is then obtained by dividing the volume into the weight.

Table I reports the room temperature modulus of rupture using a 4-point test and Young's modulus properties vs. relative density for the 4"×4"×1" bodies produced above and a comparison zirconia-alumina sample.

TABLE I

| Relative Density (%) | E(GPa) | E(kpsi) | MOR (psi) | MOR (MPa) |
|---|---|---|---|---|
| 10.0 | 3.0 | 438.6 | 162 | 1.1 |
| 12.0 | 3.6 | 526.3 | 207 | 1.4 |
| 15.0 | 5.2 | 754.1 | 361 | 2.5 |
| 18.5 | 7.7 | 1112.6 | 408 | 2.8 |
| 18.5* | 8.0 | 1162.6 | 248 | 1.7 |

*Fe/ZA sample for comparison.

As can be seen from Table I, the strength of the yttria stabilized zirconia-alumina (YZA) is approximately twice that of ZA. Or, put another way, YZA at 12-13% relative density is about as strong as the standard ZA at 18.5% relative density. Thus, lower density filters can be made from the YZA. The strength of 4"×2"×1" YZA filters were measured using a three-point bend test over a range of temperatures, as shown in Table II below.

TABLE II

| Temperature (deg C.) | MOR (psi) | MOR (MPa) |
|---|---|---|
| 23 | 523 | 3.6 |
| 1000 | 178 | 1.2 |
| 1550 | 166 | 1.1 |

Since the monoclinic-tetragonal phase transformation occurs at about 1000° C., one might anticipate a loss of strength at or above this temperature, as seen in Table II. However, the YZA filter does not lose much more strength between 1000° C. and 1550° C. It should be noted that at 1550° C., the YZA filter is still approximately twice the strength of the standard ZA filter at that temperature.

The ceramic bodies were further analyzed for their zirconia content and for their thermal expansion characteristics. It was found that the YZA bodies contained only 28% monoclinic zirconia phase. Standard zirconia-alumina bodies contain about 65% monoclinic zirconia phase. It was also found that the YZA bodies of the present invention have a much smaller volume change on going through the zirconia phase transformations on both heating and cooling, because of the lower monoclinic fraction. Thus, the tendency to form macrocracks during firing is substantially reduced in the YZA body.

EXAMPLE II

For comparison purposes, ceramic filter bodies were formed from a zirconia-alumina slurry stabilized with calcia only; i.e. no yttria additions were used. The slurry had the following composition:

| Material | Amount |
|---|---|
| Calcia Stabilized Zirconia | 52.7% |
| Alumina | 33.4% |
| Alumina Fiber | 0.9% |
| Hot Water | 9.7% |
| Xanthum Gum | 0.2% |
| Dispersant | 1.7% |
| Additional Water | 1.1% |
| Ice | 1.4% |

10 ppi filters were made from this composition to a relative density of 15%. The filters were made by immersing pieces of polyurethane foam in the slurry and following the procedure outlined in Example I.

The mean cold MOR (4 point blending) was 292 psi, which is significantly lower than the 361 psi recorded on YZA filters made to the same density.

As can be seen from the foregoing, ceramic bodies having excellent strength, density and stability properties and particular utility in molten metal filtration applications are provided in accordance with the present invention.

It is apparent that there has been provided in accordance with this invention ceramic bodies formed from yttria stabilized zirconia-alumina which fully satisfy the objects, means, and advantages set forth the hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A porous ceramic body suitable for use as a molten metal filter, said body having an open cell structure characterized by a plurality of interconnected voids surrounded by a web of ceramic, said ceramic comprising a yttria stabilized zirconia-alumina composition consisting essentially of from about 40% to about 80% zirconia, from about 1.1% to about 3.4% yttria, and the balance essentially alumina.

2. The body of claim 1 wherein said composition further includes from about 1.1% to about 3.4ceramic fiber for prevention of drying cracks and increased strength.

3. The body of claim 1 wherein said body has a bulk density in the range of from about 10% to about 18.5% of the theoretical density for ceramic material of the same size.

4. The body of claim 1 wherein said body has a bulk density in the range of from about 12% to about 15% of the theoretical density for ceramic material of the same size.

5. The body of claim 1 wherein from about 5% to about 80% by weight of said zirconia present in said body is in a monoclinic phase and the remainder is essentially in a cubic phase.

6. The body of claim 1 wherein from about 40% to about 60% by weight of said zirconia present in said body is in a monoclinic phase and the remainder is essentially in a cubic phase.

7. The body of claim 1 further being characterized by a modulus of rupture at room temperature in the range of from about 160 psi to about 410 psi.

8. The body of claim 1 further being characterized by a high temperature strength in the range of from about 178 psi to about 166 psi at a temperature in the range of 1000° C. to about 1550° C.

9. A process for producing a ceramic body having higher strength properties at lower bulk densities which renders the body suitable for use as a molten metal filter which comprises:
   forming an aqueous thixotropic slurry having a composition consisting essentially of from about 32% to about 64% zirconia, from about 1.0% to about 3.4% yttria, from about 13.6% to about 47.2% alumina, and the balance essentially water;
   impregnating a porous substrate material with said slurry by immersing said material in said slurry;
   drying said impregnated material; and heating said impregnated material to an elevated temperature so as to volatilize said substrate material and sinter the remaining material to produce said ceramic body, said zirconia becoming at least partially stabilized by said yttria during said heating step.

10. The process of claim 9 wherein said slurry forming step comprises adding said yttria for stabilizing said zirconia in situ.

11. The process of claim 9 wherein said heating step comprises heating said impregnated material to a temperature in the range of from about 1570° C. to about 1620° C. for a time period in the range of from 15 minutes to about 3 hours and thereby producing a ceramic body having at room temperature from about 5% to about 80% of said zirconia in a monoclinic phase and the balance of said zirconia in essentially a cubic phase.

12. The process of claim 9 wherein said slurry forming step further consists of adding from about 0.2% to about 0.3% of a binder material, from about 0.8% to about 3.0% of a ceramic fiber, and from about 0.2% to about 2.0% of a dispersant to said slurry.

13. The process according to claim 9 wherein said slurry forming step comprises:
dry blending said zirconia and alumina; and
adding a solution containing said yttria to said dry blended materials.

14. An aqueous slurry for use in preparing a ceramic body suitable for use as a molten metal filter, said slurry being characterized by a solids content comprising from about 40% to about 80% by weight of zirconia stabilized in situ with from about 1.1% to about 3.4% by weight yttria, from about 13.6% to about 47.2% alumina, and from about 1.1% to about 3.4% ceramic fiber.

* * * * *